Nov. 24, 1964   H. T. CAMPBELL ETAL   3,157,911
APPARATUS FOR REMOVING ARTICLES FROM CAVITIES OF MOLDS
Filed Dec. 8, 1961   2 Sheets-Sheet 1
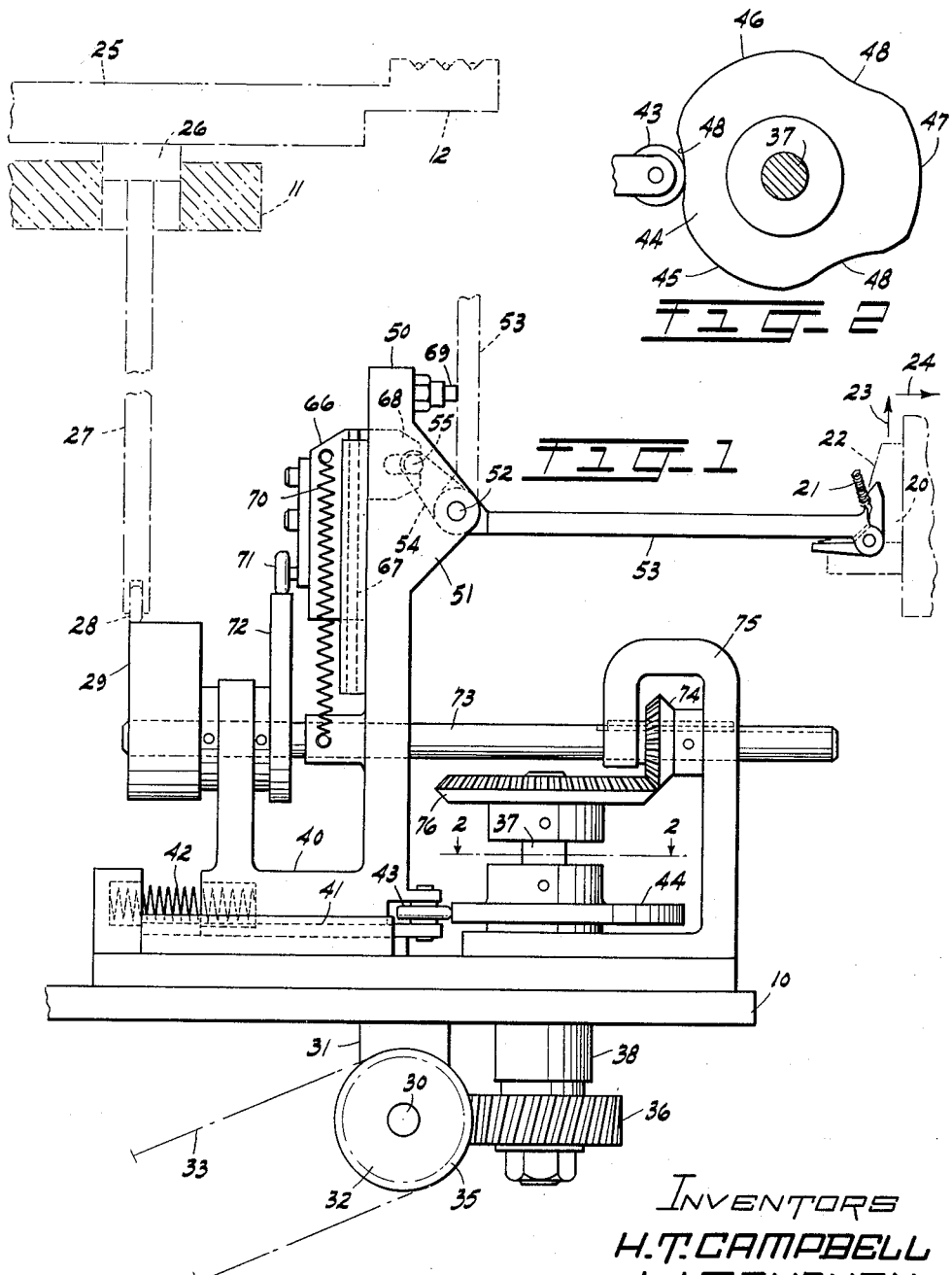
INVENTORS
H. T. CAMPBELL
J. J. MONAHAN
J. A. ROEDER
By W. A. Johnson
ATTORNEY

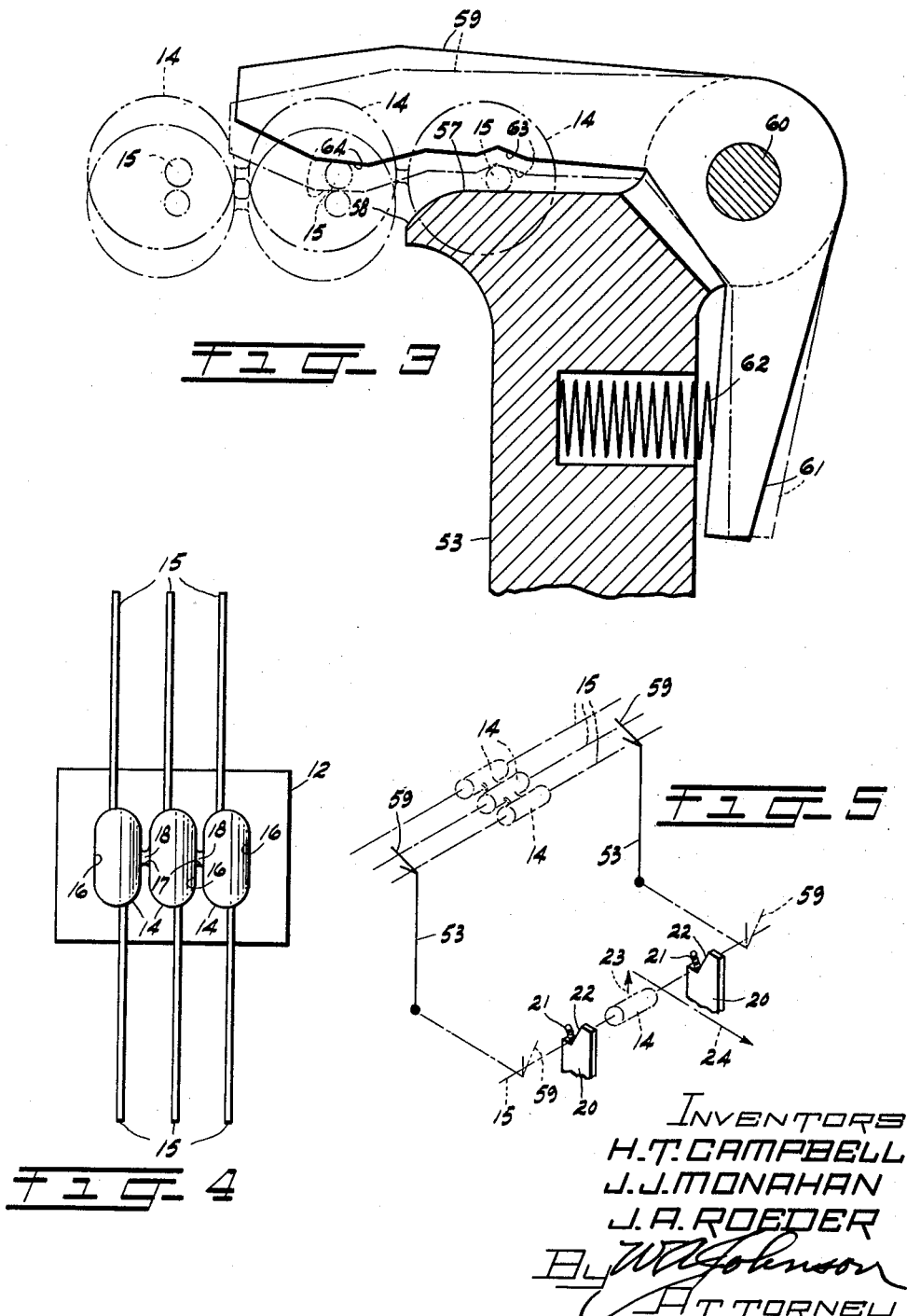

United States Patent Office 3,157,911
Patented Nov. 24, 1964

3,157,911
APPARATUS FOR REMOVING ARTICLES FROM CAVITIES OF MOLDS
Hobart T. Campbell and Jack J. Monahan, Allentown, and Joseph A. Roeder, Quakertown, Pa., assignors to Western Electric Company Incorporated, New York, N.Y., a corporation of New York
Filed Dec. 8, 1961, Ser. No. 158,048
3 Claims. (Cl. 18—5)

This invention relates to apparatus for removing articles from cavities of molds, particularly components which are to be transferred from molds to holders for the components.

In the manufacture of certain types of electrical components, such as varistors, lead wires extend outwardly from overlapping inner ends where the inner ends are secured in assembly to wafers and this portion of each assembly is embedded in a molding compound, as illustrated in applicants' co-pending application, Serial No. 157,965, filed December 8, 1961. In the present instance, the component assemblies are completed in one turret type unit and transferred singly to successive molds of another turret type unit, the molds having groups of cavities so that each mold may function in the completion of a group of articles or components. In molding articles or components of this type, particularly when a plurality is completed in a single mold, they are connected together by portions of the molding compound in the conventional mold passageways connecting the different cavities. Therefore, in order to remove the molded articles singly, these connections must be broken without disturbing the main molded portions.

The object of the present invention is an apparatus which is simple in structure, yet highly efficient in removing molded articles from molds and positioning them in holders.

According to the object, the invention comprises an apparatus for removing articles from cavities of molds at an unload station and transferring them to holders movable singly into and out of the unload station. This is accomplished through an arm pivotally mounted at one end and having relatively movable jaws at the other end adapted to engage the article or the leads of a component, remove the article from the molds, and insert the article in the holder. More specifically, a single drive carries out different functions of imparting various movements to the arm and also the mold to render the removing actions effective.

Other objects and advantages will be apparent from the following detailed description when considered in conjunction with the accompanying drawings wherein:

FIG. 1 is a side elevational view of the apparatus disposed at an unloading station of a molding machine;

FIGURE 2 is a fragmentary sectional view taken along the line 2—2 of FIG. 1;

FIG. 3 is an enlarged fragmentary sectional view of one of the arms;

FIG. 4 is a top plan view of a group of molded articles resting in a lower mold member; and FIG. 5 is a schematic illustration of the actions of the apparatus.

The apparatus includes a support 10 mounted adjacent an unload station of a turret type unit 11 having molds 12 disposed radially thereon. The mold 12 constitutes only the lower portion of a complete mold. In the present instance, as illustrated in the aforementioned co-pending application, there are 16 molds positioned radially about the turret which are moved successively into the unload station to present their groups of completed articles or components 14. As previously stated, the components have outwardly extending leads 15 with overlapping inner ends, not shown, secured to wafers, the inner portions including the overlapping inner ends and the wafers being disposed initially in mold cavities 16 where they are embedded in a molding compound. The mold 12 has the conventional passageways 17 between the cavities 16 producing connecting portions 18 between the molded articles or components 14.

It is important that the articles or components 14 be removed singly from each mold cavity in the unload station and be transferred to holders 20 supported on suitable conveying means adapted to present the holders singly at predetermined locations adjacent the unload station for each article or component to be removed.

In the present instance, the holders, as shown schematically in FIG. 5, are in pairs to receive the respective leads of each component, resilient members 21 serving to mechanically and electrically hold the leads firmly against surfaces 22 of the holders. Suitable means, not shown, causes movements, as illustrated by arrows 23 and 24 of the holders for a purpose hereinafter described. The molds 12 are supported by elements 25 for guided movement through the aid of means 26 supporting a rod 27 and carrying a cam follower 28 responsive to movements of a cam 29.

The apparatus is provided with a single drive represented by a shaft 30 rotatably carried at 31 by the support 10 and having a sprocket 32 fixed thereto and connected by a chain 33 to a suitable means such as a motor operable during predetermined intervals to bring about operating cycles of the apparatus for each article in each mold 12. A helical gear 35 is mounted on the drive shaft 30 and interengages a helical gear 36 mounted on a shaft 37 which is journalled in suitable bearings 38.

A carriage 40 movable on the support 10 between guides 41, only one of which is shown, is normally urged to the right by a spring 42 and carries a cam follower 43 held by the spring 42 in engagement with a cam 44. The cam 44 is provided with three high portions 45, 46, and 47, spaced varied distances from the axis of the cam on the axis of the shaft 37 on which the cam is mounted. These high portions function in controlling the position of the carriage 40 relative to the mold 12 according to the spacing of the cavities 16 in the mold 12. The cam 44 also has low portions 48 interposed between the high portions serving to locate the carriage relative to the holders 20 in the unload station.

The carriage 40 has a vertical portion 50 with a bifurcated or open portion 51 carrying a pivot 52 for arms 53 which are connected to each other adjacent the pivot 52 and provided with a projection 54 carrying a pin 55. The outer end of each arm 53 has a fixed jaw 57 curved at its entrance end, as at 58, and cooperating with a movable jaw 59 which is pivotally supported at 60 on its respective arm. The movable jaw 59 of each arm has a projection 61 engaged by a spring 62 normally urging the jaws closed or the movable jaw 59 toward the stationary or fixed jaw 57. The movable jaw 59 is longer than the stationary jaw 57 and is provided with a notch 63 to engage its respective lead of the nearest component, while a surface 64 of the movable jaw engages its respective lead of the next component so that relative movements of the jaws will result in breaking the connection 18 between the components.

The arms 53, through the connection 54, and pin 55 are operatively connected to an actuator 66 movable between guides 67, only one of which is shown, supported by the vertical member 50. A bifurcated projection 68 of the actuator 66 straddles the pin 55 so that during movement of the actuator, the arms 53 may be moved between the positions shown in solid and broken lines in FIG. 2. An adjustable stop 69, supported by the vertical member 50, controls the vertical positions of the arms. The actuator 66 is urged downwardly by springs 70, only one of which is shown, to hold a cam follower 71 carried by the actuator in engagement with a cam 72. The cams 29 and 72 are mounted on a shaft 73 supported for rotation on the carriage 40 and movable axially in a beveled gear 74 which is keyed to the shaft 73. The beveled gear 74 is held against axial movement by a bracket 75 and positioned to interengage the beveled gear 76 mounted on the upper end of the shaft 37. The ratio of the gears 74 and 76 is 1 to 3 so that during every one-third cycle of the shaft 37 and the cam 44, the shaft 73 and the cams 29 and 72 will move through complete cycles.

Operation

The apparatus being disposed at an unload station where holders 20 are moved into position during predetermined intervals, during each interval of rest of the turret 11, makes it necessary for the apparatus through its single drive 30 to bring about three revolutions of the shaft 73 with its cams 29 and 72 during each single cycle of the cam 44, producing three different operations of the apparatus particularly the location of the carriage during movement of the three differently spaced articles or components from the mold.

After a mold 20 is moved into the unload station, the arms 53 are located by the high portion 45 of the cam 44 so that when they are moved into their vertical positions, the fixed jaws 57 of the arms will move beneath the leads of the first article or component when the mold 12 has been moved by the cam 29 into its uppermost position. When the arms are moved to receive the first article or component, as illustrated in FIG. 3, the movable jaw 59 of each arm will ride over its respective leads of the first component and come to rest with the surface 64 upon the leads of the central component and the notch 63 above the lead of the first component. During the next action of the cam 29 to move the mold 12 downwardly until the element 25 rests on the turret 11, the movable jaws 59 will move toward their stationary jaws through the forces of the springs 62, to cause breaking of the connection 18 between the first and second or between the outermost and central component in the mold. As soon as this has been accomplished and the leads of the first component are gripped, the cam 72 moves the actuator 66 to move the arms 53 from the vertical to the horizontal positions and, in doing so, will transfer the component held by the jaws to the holders 20. It has been defined that the holders 20 are moved according to the arrows 23 and 24. If desired, the spring members 21 may be positioned sufficiently close to the surfaces 20 to cause gripping of the leads of the component being moved into the holder to cause removal of the component from the jaws before the arms reach the end of their downward movement into the horizontal positions. When the component is removed from the jaws and the holder is moved away from the unload station to bring another holder into position, the arms are again raised through the next single cycle of the arms and the next ⅓ cycle of the high portion 46 of the cam 44 to move the fixed jaws into engagement with the leads of the central component and the surfaces 64 of the movable jaws into engagement with the leads of the third component.

Following this action of the apparatus, including the lowering of the mold by the cam 29 permitting the movable jaws to break the connection between the central component and the last component so that the central component may be transferred to its respective holder 20, it will be apparent that during the third action of the apparatus in each sequence, there will be no breaking action for the removal of the final component from the mold, which will result from the moving of the carriage by the high portion 47 of the cam 44.

These series of actions of the apparatus are carried out for each mold 12 moved into the unload station, the jaws of the arms 53 being adapted to effectively break the connections between the molded articles, the high portions 45, 46 and 47 of the cam 44 controlling the positioning of the jaws of the arms relative to the successive components in each mold, and the functions of the cams 29 and 72 respectively raising and lowering the mold during each operation and operating the actuator 66 to swing the arms between their receiving positions and their unloading positions. In actual structure, the arms 53 are positioned as close as conveniently possible to each other to have their jaws engage the leads adjacent the molds. Also, the holders 20 are positioned on their conveyor means closer to each other than illustrated in FIG. 5.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for removing from a mold a first component joined to a second component by a connection, each component having at least one lead extending therefrom,
   a first jaw positioned beneath and in contact with the lead of said first component,
   a second jaw having a notch positioned over the lead of the first component and having a surface formed on said second jaw and positioned over and in contact with the lead of the second component,
   means for biasing said second jaw toward said first jaw, and
   means for lowering the mold to render effective the biasing means to move said notch of said second jaw to grip the lead of said first component and to move downwardly said surface of said second jaw to break the connection joining said first and second components.

2. An apparatus for removing from a mold a first component joined to a second component by a connection of molding material, each component having a pair of oppositely extending leads resting on the mold and extending beyond the edges of the mold, comprising:
   a pair of first jaws, each being positioned beneath and in contact with one of the leads of said first component,
   a pair of second jaws, each having a notch being positioned over one of the leads of said first component, and each having a surface formed thereon and positioned over and in contact with one of the leads of said second component,
   means for biasing said second jaws toward said first jaws, and
   means for lowering the mold to render effective the biasing means:
   to move downwardly the notches of said second jaws to engage the edges of said notches with the leads of said first component to hold said leads of said first component between said edges and said first jaws, and to move downwardly said surfaces of said second jaws to break the connection joining said components to drop said second component back into said lowered mold, while retaining said first component between said edges and said first jaws.

3. The apparatus in accordance with claim 2, wherein each second jaw is pivotally mounted to one of the first jaws and each second jaw includes a projection between which projection and the first jaw the biasing means is mounted.

References Cited in the file of this patent

UNITED STATES PATENTS

| | | |
|---|---|---|
| 319,564 | Cook | June 9, 1885 |
| 1,547,146 | Peiler | July 21, 1925 |
| 2,665,814 | Brooks | Jan. 12, 1954 |
| 2,742,965 | Drummond | Apr. 24, 1956 |
| 3,010,589 | Davis | Nov. 28, 1961 |
| 3,104,765 | Campbell | Sept. 24, 1963 |